United States Patent
Michaud et al.

(10) Patent No.: US 11,279,786 B2
(45) Date of Patent: Mar. 22, 2022

(54) LIQUID HYDROCARBON COPOLYMERS HAVING TWO CYCLOCARBONATE ETHER END GROUPS

(71) Applicants: BOSTIK SA, Colombes (FR); CENTRE NATIONAL DE LA RECHERCHE SCIENTIFIQUE, Paris (FR); UNIVERSITE DE RENNES 1, Rennes (FR)

(72) Inventors: Guillaume Michaud, Compiegne (FR); Stephane Fouquay, Mont Saint-Aignan (FR); Frederic Simon, Pont L'eveque (FR); Sophie Guillaume, Vitre (FR); Jean-Francois Carpentier, Acigne (FR); Cyril Chauveau, Rennes (FR)

(73) Assignees: BOSTIK SA, Colombes (FR); CENTRE NATIONAL DE LA RECHERCHE SCIENTIFIQUE, Paris (FR); UNIVERSITE DE RENNES 1, Rennes (FR)

( * ) Notice: Subject to any disclaimer, the term of this patent is extended or adjusted under 35 U.S.C. 154(b) by 71 days.

(21) Appl. No.: 16/651,710

(22) PCT Filed: Sep. 27, 2018

(86) PCT No.: PCT/FR2018/052379
§ 371 (c)(1),
(2) Date: Mar. 27, 2020

(87) PCT Pub. No.: WO2019/063944
PCT Pub. Date: Apr. 4, 2019

(65) Prior Publication Data
US 2020/0255571 A1 Aug. 13, 2020

(30) Foreign Application Priority Data
Sep. 28, 2017 (FR) ...................................... 1759007

(51) Int. Cl.
*C08F 236/08* (2006.01)
*C08F 236/22* (2006.01)
(Continued)

(52) U.S. Cl.
CPC .......... *C08F 236/08* (2013.01); *C08F 236/22* (2013.01); *C08G 61/04* (2013.01);
(Continued)

(58) Field of Classification Search
CPC .... C08F 236/08; C08F 236/22; C08F 236/06; C08G 61/04; C08G 71/04; C08G 2170/00; C08G 2261/122; C08G 2261/1646; C08G 2261/3324; C08G 2261/1414; C08G 2261/418; C08G 2261/74; C08G 2261/1412; C08G 2261/72; C08G 2261/3323; C08G 2261/73; C08G 2261/724; C08G 2261/75; C08G 61/08;
(Continued)

(56) References Cited

U.S. PATENT DOCUMENTS

| 4,428,806 A | 1/1984 | Sakamoto et al. |
| 8,058,351 B2 | 11/2011 | Pawlow et al. |

(Continued)

FOREIGN PATENT DOCUMENTS

| EP | 0078413 B1 | 7/1985 |
| GB | 1495555 A | 12/1977 |

(Continued)

OTHER PUBLICATIONS

International Search Report PCT/FR2018/052379 dated Jan. 8, 2019 (pp. 1-4).
Michel Xiao Lu et al: Simple access to alkoxysilyl telechelic polyolefins from ruthenium-catalyzed cross-metathesis depolymerization of pol ydi enes, European Polymer Journal, [Online] vol. 96, Nov. 5, 2017 (Nov. 5, 2017), pp. 403-413, XP085244139, ISSN: 0014-3057.

(Continued)

*Primary Examiner* — Robert C Boyle
(74) *Attorney, Agent, or Firm* — Millen, White, Zelano and Branigan, P.C.; Harry B. Shubin

(57) ABSTRACT

1) Hydrocarbon-based copolymer comprising two end groups preceded by an ether function and chosen from a 2-oxo-1,3-dioxolan-4-yl (or cyclocarbonate), a dithiocyclocarbonate, and a 2-oxo-1,3-dioxolen-4-yl, the main chain of which comprises units (I) and (II)

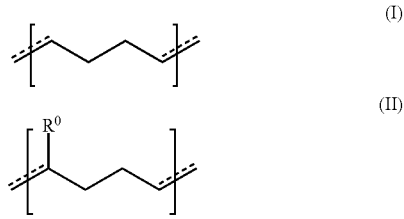

in which $R^0$ is notably a methyl radical;
and the number-average molecular mass Mn of which is between 400 and 100 000 g/mol.

2) Process for preparing said copolymer, comprising:
   (i) a step of heating a statistical bipolymer A chosen from a poly(butadiene-isoprene), a poly(butadiene-myrcene) and a poly(butadiene-farnesene); and then
   (ii) a step of heating the product formed, in the presence of a chain-transfer agent.

3) Use as adhesive, as a mixture with an amine compound comprising at least two amine groups.

16 Claims, No Drawings

(51) Int. Cl.
  *C08G 61/04* (2006.01)
  *C09J 175/14* (2006.01)
  *C08G 71/04* (2006.01)

(52) U.S. Cl.
  CPC ............ *C09J 175/14* (2013.01); *C08G 71/04* (2013.01); *C08G 2170/00* (2013.01); *C08G 2261/122* (2013.01); *C08G 2261/1414* (2013.01); *C08G 2261/1646* (2013.01); *C08G 2261/3324* (2013.01); *C08G 2261/418* (2013.01); *C08G 2261/74* (2013.01)

(58) Field of Classification Search
  CPC ............... C08G 2190/00; C09J 175/14; C08C 2019/09; C08C 19/34; C08C 19/40; C08C 19/08; C08C 19/10; C08C 19/20; C08C 19/28; C09D 175/14
  See application file for complete search history.

(56) References Cited

U.S. PATENT DOCUMENTS

| | | | |
|---|---|---|---|
| 9,359,459 B2 | 6/2016 | Michaud et al. | |
| 9,643,948 B2* | 5/2017 | Putzien | C07B 41/08 |
| 2015/0259470 A1* | 9/2015 | Michaud | C08G 71/04 |
| | | | 528/341 |
| 2015/0315310 A1* | 11/2015 | Michaud | C08F 132/04 |
| | | | 526/171 |
| 2018/0291153 A1 | 10/2018 | Cron et al. | |

FOREIGN PATENT DOCUMENTS

| WO | 06127483 A1 | 11/2006 |
| WO | 14068250 A1 | 5/2014 |
| WO | 14091173 A1 | 6/2014 |
| WO | 14206636 A1 | 12/2014 |
| WO | 17001172 A1 | 1/2017 |

OTHER PUBLICATIONS

Elise Vanbiervliet et al: "From Epoxide to Cyclodithiocarbonate Telechelic Polycyclooctene through Chain-Transfer Ring-Opening Metathesis Polymerization (ROMP): Precursors to Non-Isocyanate Polyurethanes (NIPUs)", Macromolecules, vol. 50, No. 1, Dec. 22, 2016 (Dec. 22, 2016), pp. 69-82, XP055482288 ISSN: 0024-9297.

* cited by examiner

LIQUID HYDROCARBON COPOLYMERS HAVING TWO CYCLOCARBONATE ETHER END GROUPS

The present invention relates to hydrocarbon-based polymers comprising two end groups of cyclocarbonate or similar type, to the process for preparing them and to their use in the manufacture of coating, mastic or adhesive compositions.

It is known practice to use polyurethanes to manufacture various coating, mastic or adhesive compositions.

These compositions may be in the form of one-component or two-component compositions. In the latter case, the reagents required for the synthesis of the polyurethane are stored separately, optionally in the presence of other ingredients (additives), and are intended to be mixed before use of the composition, to synthesize the polyurethane at the last moment.

Polyurethanes are conventionally synthesized by reaction of a diisocyanate with a diol.

However, diisocyanates are toxic compounds per se and are generally obtained from phosgene, which is itself very toxic by inhalation or by contact. The manufacturing process used industrially generally involves the reaction of an amine with an excess of phosgene to form an isocyanate.

Furthermore, polyisocyanates are compounds that are highly sensitive in the presence of atmospheric moisture and require that appropriate measures be taken to avoid their premature crosslinking, and thus their loss of reactivity, during their handling and storage (anhydrous conditions).

The search for alternatives to the synthesis of polyurethanes without using isocyanate (or NIPU for Non-Isocyanate PolyUrethane) thus represents a major challenge.

This search has formed the subject of numerous studies. The approaches most widely studied concern the use of polymers that are capable of reacting with amines or amine oligomers to form polyurethanes or derivatives that are structurally close to polyurethanes, such as poly(thio)urethanes, which will be generically denoted in the present application by the term "polymers of polyurethane type".

Patent application WO 2014/091173 describes hydrocarbon-based polymers comprising two end groups bearing a 2-oxo-1,3-dioxolan-4-yl (also known as cyclocarbonate) end group which may be obtained by ring-opening metathesis polymerization starting from a cycloolefin, and in the presence of a chain-transfer agent and of a metathesis catalyst.

These polymers can subsequently react with a (poly) amine to form polymers of polyurethane type, without employing isocyanate, and which can advantageously be used to formulate coating, mastic or adhesive compositions. However, this reaction is relatively lengthy and remains to be improved. Patent application WO 2016/162627 also describes hydrocarbon-based polymers comprising two end groups bearing an exo-vinylene cyclocarbonate end group which may also be obtained by ring-opening metathesis polymerization starting from a cycloolefin, and in the presence of a chain-transfer agent and of a metathesis catalyst.

Patent application WO 2016/185106 describes hydrocarbon-based polymers comprising two end groups bearing a dithiocyclocarbonate (or 2-thione-1,3-oxathiolan-4-yl) end group which may also be obtained by ring-opening metathesis polymerization starting from a cycloolefin, and in the presence of a chain-transfer agent and of a metathesis catalyst. The latter polymers can subsequently react with a (poly)amine to form isocyanate-free poly(thio)urethanes, which may also be used to formulate coating, mastic or adhesive compositions.

Thus, for use as a two-component adhesive, the hydrocarbon-based polymer as described in these references and the amine compound, used as curing agent, are each included in a component of a two-component composition which is made available to the user. Said user thus, just at the time of use of the adhesive, mixes these two components, optionally under hot conditions, so as to obtain a liquid adhesive composition. This composition is applied to at least one of two faces belonging to two substrates to be assembled, which are placed in contact to bring about their assembly.

The progress of the reaction between said hydrocarbon-based polymer and the amine compound leads to the formation of a cohesive adhesive seal which ensures the solidity of the assembly of these two substrates. This adhesive seal thus consists mainly of the product of said reaction, and consequently of a polyurethane or of a poly(thio) urethane, depending on the case.

However, it may be necessary to use the hydrocarbon-based polymer as described in these references in the form of a composition comprising other constituents, for instance tackifying resins, plasticizers, adhesion promoters, one or more additives with a reinforcing effect, for instance a mineral filler, or else one or more additives aimed at improving the curing time (i.e. the time at the end of which the crosslinking can be regarded as complete) or other characteristics, such as the rheology or the mechanical performance (elongation, modulus, etc.).

The hydrocarbon-based polymers described in the prior art references mentioned previously may be liquid, but they are then obtained from substituted cycloolefins that are difficult to access industrially as starting materials.

Said hydrocarbon-based polymers described are more generally solid, and must thus be applied while hot for the purpose of mixing them with the curing agent.

However, it is more convenient for the adhesives and/or mastics industry to have available compositions which can be applied at room temperature by the end user and which can also be manufactured industrially, also at room temperature, by simple mixing of the hydrocarbon-based polymer and of the additional constituents mentioned above.

It is thus particularly advantageous to have available, for this purpose, hydrocarbon-based polymers bearing end groups of cyclocarbonate or similar type, which are themselves liquid at room temperature.

The aim of the present invention is to propose novel polymers bearing two end groups of cyclocarbonate or similar type, which overcome these drawbacks.

Another aim of the present invention is to propose polymers that are liquid at room temperature, which can lead, after mixing with a curing agent, to the formation of an adhesive seal having improved mechanical properties.

Another aim of the present invention is to propose polymers that are liquid at room temperature, the synthesis of which does not involve isocyanates, and which are capable of reacting with a poly(amine) in a short time, to form polymers of polyurethane type.

Another aim of the present invention is to propose liquid polymers bearing end groups of cyclocarbonate or similar type, which are notably of lower viscosity at room temperature, and which may also be manufactured via a process which uses starting materials that are widely industrially available.

Another aim of the present invention is to propose such polymers, which can also be manufactured industrially via a process whose exothermicity is easier to control.

It has now been found that these aims may be achieved, in total or in part, by means of the hydrocarbon-based polymer described below.

Thus, the present invention relates to a hydrocarbon-based copolymer P comprising two end groups $F^1$ and $F^2$ of cyclocarbonate and similar type, having the respective formulae:

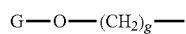
and

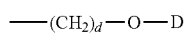

in which:
- g and d, which may be identical or different, represent an integer equal to 1, 2 or 3; and
- G and D are two monovalent radicals such that the pair (G, D) is chosen from pairs as follows:
  (G1, D1 of formulae:

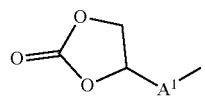

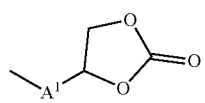

in which $A^1$ is an alkylene group comprising from 1 to 9 carbon atoms;

(G2, D2) of formulae:

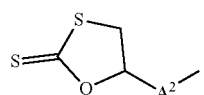

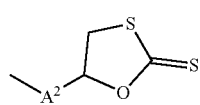

in which $A^2$ is an alkylene group comprising from 1 to 9 carbon atoms;

(G3, D3) of formulae:

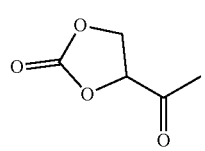

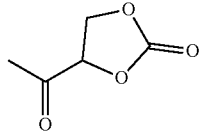

(G4, D4) of respective formulae:

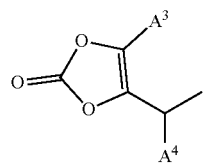

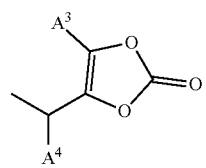

in which:
$A^3$ and $A^4$, which may be identical or different, each represent a hydrogen atom, a linear or branched alkyl radical comprising from 1 to 6 carbon atoms, a cycloalkyl radical comprising 5 or 6 carbon atoms, a phenyl radical or an alkylphenyl group, the alkyl chain of which comprises from 1 to 4 carbon atoms; $A^3$ and $A^4$ also possibly being bonded together to form a group —$(CH_2—)_q$— in which q is an integer ranging from 3 to 5;

characterized in that the main chain of said copolymer P comprises:
a unit (I) of formula (I) repeated p times, p being an integer other than 0:

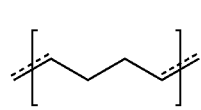

a unit (II) of formula (II) repeated n times, n being an integer other than 0:

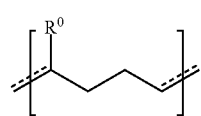

in which $R^0$ represents a methyl radical or one of the three radicals having the following formula:

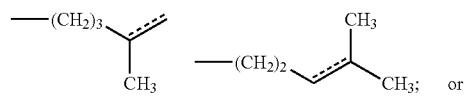

-continued $$—(CH_2)_2\diagdown\diagup\diagdown\underset{CH_3}{\overset{CH_3}{\diagup}}\diagdown\diagup\underset{CH_3}{\overset{CH_3}{\diagup}};$$

and, optionally, a unit (III) of formula (III) repeated m times, m being an integer greater than or equal to 0:

$$\left[\begin{array}{c}R^5\\ \diagup\diagdown\\ R^1\diagup\diagdown R^4\\ R^2\quad R^3\end{array}\right] \quad \text{(III)}$$

in which:

$R^1$, $R^2$, $R^3$ and $R^4$, which may be identical or different, represent:
- a hydrogen or halogen atom; or
- a radical comprising from 1 to 22 carbon atoms which is chosen from alkyl, alkenyl, alkoxycarbonyl, alkenyloxycarbonyl, alkylcarbonyloxy, alkenylcarbonyloxy and alkylcarbonyloxyalkyl, the hydrocarbon-based chain of said radical possibly being optionally interrupted with at least one oxygen atom or one sulfur atom; in addition:
- at least one of the groups $R^1$ to $R^4$ can form, with at least one other of the groups $R^1$ to $R^4$ and with the carbon atom or atoms to which said groups are linked, a 3- to 10-membered, optionally substituted, saturated or unsaturated hydrocarbon-based ring or heterocycle; and
- at least one of the pairs ($R^1$, $R^2$) and ($R^3$, $R^4$) can form, with the carbon atom to which said pair is linked, a group of two carbon atoms linked by a double bond: C=C, the other carbon atom of which bears two substituents chosen from a hydrogen atom and a $C_1$-$C_4$ alkyl radical; and
- the carbon atom bearing one of the groups of the pair ($R^1$, $R^2$) may be linked to the carbon atom bearing one of the groups of the pair ($R^3$, $R^4$) by a double bond, it being understood that, in accordance with the valency rules, only one of the groups of each of these two pairs is then present;

$R^5$ represents:
- an oxygen or sulfur atom, or
- a divalent radical —$CH_2$—, —C(=O)— or —$NR^6$— in which $R^6$ is an alkyl or alkenyl radical comprising from 1 to 22 carbon atoms;

it also being pointed out that:
- the bond ═══ represents a single bond or a double bond;
- $F^1$ and $F^2$ are each linked to one of the two ends of the main chain and to a unit (I); and
- n, p and m are such that the number-average molecular mass Mn of the copolymer P is within a range extending from 400 to 100 000 g/mol and its polydispersity index is within a range extending from 1.5 to 3.0.

The various groups, radicals and letters which are included in formulae $F^1$ and $F^2$ and in the definition of the main chain of the copolymer P retain the same meaning throughout the present text, unless otherwise indicated.

The units (I), (II) and, optionally, (III) are divalent radicals that are randomly distributed in the main chain of the copolymer P, with the exception of two units (I) which are directly connected to $F^1$ and $F^2$. The copolymer P is thus a statistical copolymer.

The main chain of the copolymer P thus comprises two or three repeating units:
- a first repeating unit (I) repeated p times of formula (I),
- a second repeating unit (II) repeated n times of formula (II), and
- a third repeating unit (III) repeated m times of formula (III), which is optional;

such that the copolymer P may be a bipolymer (presence of the two repeating units (I) and (II)) or a terpolymer (presence of the three repeating units (I), (II) and (III)).

As is apparent above, the end groups $F^1$ and $F^2$ are generally symmetrical relative to the main chain, i.e. they correspond substantially, with the exception of the indices g and d.

The term "heterocycle" means a hydrocarbon-based ring which may comprise an atom other than carbon in the chain of the ring, for instance oxygen, sulfur or nitrogen atoms.

The term "end group" means a group located at one of the two ends of the main chain of the polymer.

The term "copolymer" means a polymer derived from the copolymerization of at least two comonomers, i.e. of two chemically different monomers. The main chain of a copolymer comprises at least two chemically different repeating units.

The term "terpolymer" means a copolymer derived from the copolymerization of three comonomers, and the main chain of which essentially consists of three different repeating units.

The term "bipolymer" denotes a copolymer derived from the copolymerization of two comonomers, and the main chain of which essentially consists of two different repeating units.

The polydispersity index (also known as the PDI) is defined as the ratio Mw/Mn, i.e. the ratio of the weight-average molecular mass to the number-average molecular mass of the polymer.

In the present text, the two average molecular masses Mn and Mw are measured by size exclusion chromatography (or SEC), which is also denoted by the term "gel permeation chromatography" (or GPC). The calibration performed is usually a PEG (PolyEthylene Glycol) or PS (PolyStyrene), preferably PS, calibration.

The copolymer P according to the invention is particularly homogeneous and heat-stable and advantageously liquid at room temperature. It is advantageously, at room temperature, in the form of a viscous liquid whose Brookfield viscosity at 23° C. is between 1 mPa.s and 150 Pa.s, preferably between 1 and 50 Pa.s.

It can react with a primary and/or secondary polyamine, in a polyaddition reaction, at a temperature of less than or equal to 80° C. and even at room temperature, to form, after a reaction time that is advantageously short, a polymer of polyurethane type which can constitute an adhesive seal.

The adhesive seal thus formed has high cohesive values, in particular of greater than 2 MPa. Such cohesive values allow said polymer to be used as adhesive, for example as leaktightness seal on an ordinary support (concrete, glass, marble), in the building industry, or alternatively for the bonding of glazings in the motor vehicle and naval industries.

According to a preferred variant, the main chain of the copolymer P consists essentially of the repeating unit (I) of formula (I), of the repeating unit (II) of formula (II) and, optionally, of the repeating unit (III) of formula (III). Thus, the number of units (I), (II) and, optionally, (III) advantageously represents at least 90% of the total number of constituent units of the main chain of the copolymer P, and even more advantageously at least 95%.

According to a preferred variant, the main chain of the copolymer P consists essentially of the repeating unit (I) of formula (I) and of the repeating unit (II) of formula (II).

According to a more preferred variant, the relative proportion of units of formula (I) and of units of formula (II) present in the main chain of the copolymer P corresponds to an excess of units of formula (I). More particularly, the number p of units (I) and the number n of units (II) are such that:

p/(n+p) is between 45% and 95%, and
n/(n+p) is between 5% and 55%.

The latter parameters may be determined analytically by $^1$H and $^{13}$C NMR spectroscopy.

According to a first embodiment, which is more preferred, of the copolymer P according to the invention, all the bonds ------ that are represented in formulae (I), (II) and, optionally, (III) and also in the formulae giving the meaning of $R^0$ are carbon-carbon double bonds.

According to this first embodiment, the main chain of the copolymer P is thus such that:

the unit (I) also has the formula (I'):

the unit (II) also has the formula (II'):

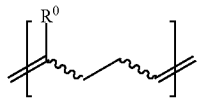

in which $R^0$ represents a methyl radical or one of the three radicals having the following formula:

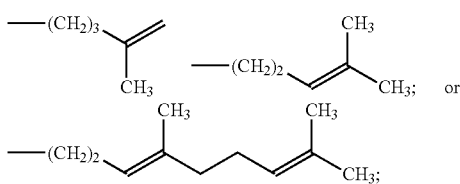

and, optionally, the unit (III) also has the formula (III'):

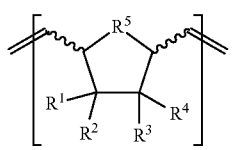

it being pointed out that, in the above formulae, the ～ bond is a single bond geometrically oriented on one side or the other relative to the double bond (cis or trans).

The corresponding units of the main chain of the copolymer P are then themselves connected via a carbon-carbon double bond.

According to a most particularly preferred variant of this first embodiment of the invention, the main chain of the copolymer P is such that:

on the p units of formula (I'), p" also correspond to formula (I"), p" being an integer other than 0, less than p and such that p"/p is greater than 0.8:

and on the n units of formula (II'), n" also correspond to formula (II"), n" being an integer other than 0, less than n and such that n"/n is greater than 0.9:

In accordance with this embodiment, at least 80% of the units of formula (I') are of cis configuration, represented by formula (I"), and at least 90% of the units of formula (II') are also of cis configuration, represented by formula (II"). The corresponding percentages may be determined by $^1$H and $^{13}$C NMR.

According to another variant of this first embodiment, m is equal to 0 and the main chain of P does not comprise any units of formula (III').

According to a second embodiment of the copolymer P according to the invention, all the bonds ------ that are represented in formulae (I), (II) and, optionally, (III) and also in the formulae giving the meaning of $R^0$ are carbon-carbon single bonds.

According to this second embodiment, the main chain of the copolymer P is thus such that:

the unit (I) also has the formula ($I^H$):

the unit (II) also has the formula ($II^H$):

in which $R^0$ represents a methyl radical or one of the three radicals having the following formula:

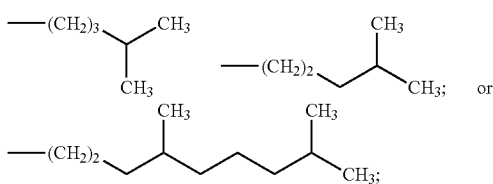

and, optionally, the unit (III) has the formula (III$^H$):

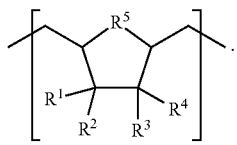

(III$^H$)

The copolymer P according to this second embodiment is derived, for example, from the hydrogenation of the copolymer P according to the first embodiment described above.

According to an even more preferred variant of each of these two embodiments, the radical R$^0$ of the unit (II) represents a methyl radical.

As now regards the end groups of cyclocarbonate and similar type of the copolymer P according to the invention, and according to a first embodiment:

F$^1$ is: G1-O—(CH$_2$)$_g$— and also has the formula:

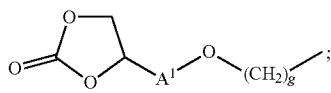

and
F$^2$ is: —(CH$_2$)$_d$—O-D1 and also has the formula:

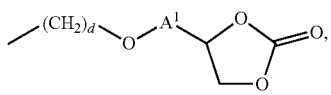

corresponding to a cyclocarbonate (or 2-oxo-1,3-dioxolan-4-yl) end group.

According to a preferred variant of said mode, A$^1$ is a methylene group.

According to another preferred variant of said mode, g and d are equal to 1.

According to a second embodiment:
F$^1$ is: G2-O—(CH$_2$)$_g$— and also has the formula:

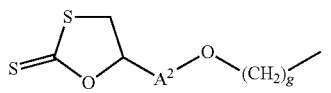

F$^2$ is: —(CH$_2$)$_d$—O-D2 and also has the formula:

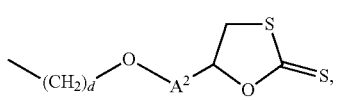

corresponding to a dithiocyclocarbonate (or 2-thione-1,3-oxathiolan-4-yl) end group.

According to a preferred variant of said mode, A$^2$ is a methylene group.

According to another preferred variant of said mode, g and d are equal to 1.

According to a third embodiment:
F$^1$ is: G3-O—(CH$_2$)$_g$— and also has the formula:

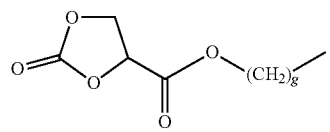

F$^2$ is: —(CH$_2$)$_d$—O-D3 and also has the formula:

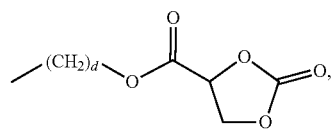

corresponding to a cyclocarbonate (or 2-oxo-1,3-dioxolan-4-yl) end group.

According to a preferred variant of said mode, g and d are equal to 1.

According to a fourth embodiment:
F$^1$ is: G4-O—(CH$_2$)$_g$— and also has the formula:

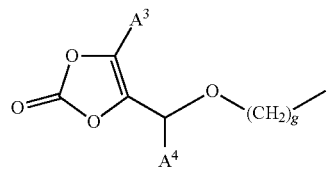

F$^2$ is: —(CH$_2$)$_d$—O-D4 and also has the formula:

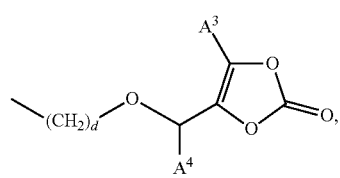

corresponding to a 2-oxo-1,3-dioxolen-4-yl end group.

According to a preferred variant of said mode, A$^3$ is a methyl and A$^4$ is a hydrogen atom.

According to another preferred variant of said mode, g and d are equal to 1.

The invention also relates to a process for preparing the hydrocarbon-based copolymer P as defined previously, said process comprising:
  (i) a step of heating at a temperature ranging from 30° C. to 80° C.:
    (a) of a statistical bipolymer A chosen from a poly (butadiene-isoprene), a poly(butadiene-myrcene) and a poly(butadiene-farnesene); and
    (b) optionally in the presence of a compound B of formula (B):

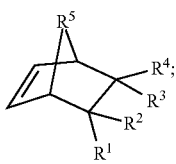
(B)

and then
(ii) a step of heating the product formed in step (i) to a temperature in a range from 20 to 60° C., in the presence of a chain-transfer agent (also referred to as CTA), it being pointed out that:
(c) when said hydrocarbon-based copolymer P is such that the pair (G, D) is (G1, D1), (G3, D3) or (G4, D4), then said CTA is a compound of formula (C):

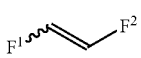
(C)

in which:
$F^1$ and $F^2$ are such that the pair (G, D) corresponds to the corresponding definition (G1, D1), (G3, D3) or (G4, D4);
the ⁓ bond is a carbon-carbon single bond geometrically oriented on one side or the other relative to the double bond (cis or trans); and
(d) when said hydrocarbon-based copolymer P is such that the pair (G, D) is (G2, D2), then said CTA is the diepoxy compound of formula (C):

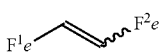
(C')

in which:
$F'^1e$ and $F'^2e$ are monovalent radicals of formulae (G') and (D'):

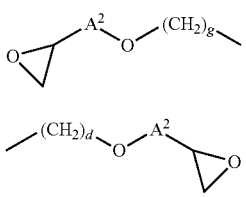
(G')

(D')

the ⁓ bond is a carbon-carbon single bond geometrically oriented on one side or the other relative to the double bond (cis or trans);
it also being pointed out that each of the steps (i) and (ii) is performed in the presence of a metathesis catalyst and of a solvent;
and then
(iii) when said hydrocarbon-based copolymer P is such that the pair (G, D) is (G2, D2), a step of dithiocarbonation of the polymer obtained in step (ii), by reaction with carbon disulfide ($CS_2$) in the presence of a halogenated lithium compound, at a temperature ranging from 10 to 45° C.

Each of the steps (i), (ii) and (iii) is described below in greater detail.

Step (i):
Step (i) involves a depolymerization reaction of the bipolymer A and intramolecular cyclization, which leads to the formation of one (or more) macrocyclic cooligomer O comprising:
the unit of formula (I') repeated $p'^o$ times, $p'^o$ being an integer other than 0;
the unit of formula (II') repeated $n'^o$ times, $n'^o$ being an integer other than 0;
and, optionally, the unit of formula (III') repeated $m'^o$ times, $m'^o$ being an integer greater than or equal to 0;
it being pointed out that $p'^o$, $n'^o$ and $m'^o$ are such that the number-average molecular mass Mn of the cyclic cooligomer(s) O is in a range extending from 162 to 5000 g/mol, preferably from 1000 to 3000 g/mol.

The formation and the structure of the macrocyclic cooligomer(s) O may be characterized by size exclusion chromatography (or SEC) and mass spectrometry techniques. The distribution in the macrocycle of the units of formulae (I'), (II') and optionally (III') is statistical.

A preferred temperature range for the heating of the bipolymer A and, optionally, of compound B, according to step (i) ranges from 30° C. to 60° C.

The corresponding heating time is adapted to obtain a yield close to 100% relative to the molar amount of bipolymer A used, and also that of the other reagents present. A time ranging from 1 hour to 8 hours, preferably from 1 to 3 hours, is generally suitable.

Bipolymer A:

The bipolymer A is a copolymer which essentially consists of two monomers and is chosen from a poly(butadiene-isoprene), a poly(butadiene-myrcene) and a poly(butadiene-farnesene).

According to a first variant, which is most particularly preferred, of the process according to the invention, the bipolymer A used in step (i) is a poly-(butadiene-isoprene). A hydrocarbon-based copolymer P according to the invention is then advantageously obtained:
either on conclusion of step (ii) when P is such that the pair (G, D) is (G1, D1), (G3, D3) or (G4, D4),
or on conclusion of step (iii) when P is such that the pair (G, D) is (G2, D2).
The main chain of P comprises, according to this same variant:
the repeating unit of formula (I') and
the repeating unit of formula (II') in which $R^o$ represents a methyl radical.

The poly(butadiene-isoprene) polymers are copolymers which constitute an industrially advantageous starting material, notably on account of their availability and of their properties in terms of industrial hygiene. The poly(butadiene-isoprene) polymers are generally obtained via various processes of polymerization:
of 1,3-butadiene of formula: $H_2C=CH-CH=CH_2$, and 2-methylbuta-1,3-diene (or isoprene), of formula:

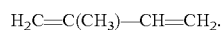

The polymerization of 1,3-butadiene may be performed according to a trans-1,4 addition or a cis-1,4 addition, resulting in a repeating unit in the copolymer chain (designated, respectively, by trans-1,4 and cis-1,4 butadiene unit), which is in the form of the two geometrical isomers having the respective formulae:

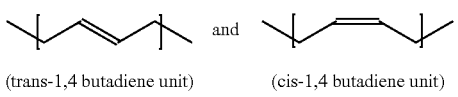

(trans-1,4 butadiene unit)   (cis-1,4 butadiene unit)

The cis-1,4 butadiene unit is identical to the unit of formula (I″) defined previously.

The polymerization of 1,3-butadiene may also be performed according to a 1,2-addition, resulting in a repeating unit in the copolymer chain (designated by vinyl-1,2 butadiene unit) which has the formula:

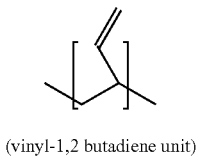

(vinyl-1,2 butadiene unit)

Thus, the poly(butadiene-isoprene) generally comprises in its chain the above three repeating units, designated hereinbelow generically by "butadiene-based units".

Similarly, the polymerization of isoprene may be performed according to a trans-1,4 addition or a cis-1,4 addition, resulting in a repeating unit in the copolymer chain (designated, respectively, by trans-1,4 and cis-1,4 isoprene unit), which is in the form of the two geometrical isomers having the respective formulae:

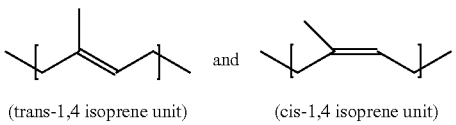

(trans-1,4 isoprene unit)   (cis-1,4 isoprene unit)

The cis-1,4 isoprene unit is identical to the unit of formula (II″) in which $R^0$ is a methyl, as defined previously.

The polymerization of isoprene may also be performed according to a 1,2-addition, resulting in a repeating unit in the copolymer chain (designated by vinyl-1,2 isoprene unit) which has the formula:

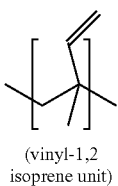

(vinyl-1,2 isoprene unit)

The polymerization of isoprene may, many, be performed according to a 3,4-addition, resulting in a repeating unit in the copolymer chain (designated by vinyl-3,4 isoprene unit) which has the formula:

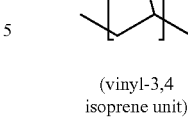

(vinyl-3,4 isoprene unit)

Thus, the poly(butadiene-isoprene) generally comprises in its chain the above four repeating units, designated hereinbelow generically by "isoprene-based units".

The poly(butadiene-isoprene) used in step (i) may have a number-average molecular mass (Mn) ranging from 3000 to 100 000 g/mol, preferably from 3000 to 50 000 g/mol, and a glass transition temperature (Tg) ranging from −110 to −60° C.

It preferably comprises from 45% to 95% by number of butadiene-based units and from 5% to 55% by number of isoprene-based units, said percentages being expressed on the basis of the total number of constituent units of the poly(butadiene-isoprene) chain.

Preferably, the chain of the poly(butadiene-isoprene) used in step (i) comprises:
   less than 5% by number of vinyl-1,2 butadiene units on the basis of the number of butadiene-based units, and
   less than 5% of the total number of vinyl-1,2 isoprene units and of vinyl-3,4 isoprene units on the basis of the number of isoprene-based units.

Even more preferentially, this twofold limit greater than 5 mol % is lowered to 2%.

According to another variant, which is most particularly preferred, the chain of the poly(butadiene-isoprene) used in step (i) comprises:
   at least 80% by number of cis-1,4 butadiene units on the basis of the number of butadiene-based units, and
   at least 90% by number of cis-1,4 isoprene units on the basis of the number of isoprene-based units.

In accordance with this last variant, such a poly(butadiene-isoprene), which is liquid at room temperature, is often termed as having "a high content of cis-1,4 butadiene and cis-1,4 isoprene units" and is also referred to by the term "high cis poly(butadiene-isoprene)". The preferred variant of the copolymer P corresponding to the presence of the units of formulae (I″) and (II″), as defined previously, is then advantageously obtained, either on conclusion of step (ii) or on conclusion of step (iii) depending on the meaning of the pair (G, D) as specified above.

The percentages by number of vinyl-1,2 butadiene, vinyl-1,2 isoprene, vinyl-3,4 isoprene, cis-1,4 butadiene and cis-1,4 isoprene units, defined above, may be determined by $^1$H and $^{13}$C NMR.

An example of such a poly(butadiene-isoprene) that may be mentioned is Kuraprene® LIR-390, which is commercially available from the company Kuraray.

This liquid poly(butadiene-isoprene) has a number-average molecular mass (Mn) equal to 48 000 g/mol. It comprises 92% by number of butadiene-based units and 8% by number of isoprene-based units, said percentages being expressed on the basis of the total number of constituent butadiene-based and isoprene-based units in the chain.

It also comprises:
   on the basis of the number of butadiene-based units, about 1% by number of vinyl-1,2 butadiene units, and on the basis of the number of isoprene-based units, about 1% by number of vinyl-1,2 isoprene units and less than 1% by number of vinyl-3,4 isoprene units.

It finally comprises:

about 85% by number of cis-1,4 butadiene units on the basis of the number of butadiene-based units, and about 98% by number of cis-1,4 isoprene units on the basis of the number of isoprene-based units.

Another example of a poly(butadiene-isoprene) that may be mentioned is Kuraprene® LIR-340, which is also commercially available from the company Kuraray.

This poly(butadiene-isoprene) has a number-average molecular mass (Mn) equal to 34 000 g/mol. It comprises 46% by number of butadiene-based units and 54% by number of isoprene-based units, said percentages being expressed on the basis of the total number of constituent units in the chain. It moreover has the same characteristics as those indicated previously for Kuraprene® LIR-390.

According to a second variant of the process according to the invention, the bipolymer A is either a poly(butadiene-myrcene) or a poly(butadiene-farnesene).

Myrcene is a natural organic compound belonging to the chemical family of monoterpenes and is an important intermediate in the fragrance industry. It is produced semi-synthetically from plants of the genus *Myrcia*. It is in the form of two geometrical isomers:

α-myrcene, having the structural formula:

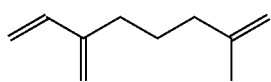

β-myrcene, having the structural formula:

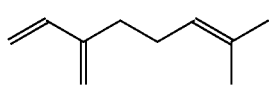

Farnesene or β-farnesene is a natural isoprenoid compound which may be chemically synthesized by oligomerization of isoprene or by dehydration of neridol. It is mainly used as a fragrance or intermediate and corresponds to the structural formula:

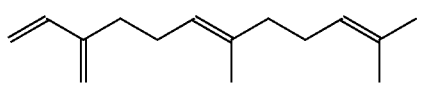

Reference is made to patent application EP 2810963 for the processes for preparing copoly(butadiene-myrcene) and copoly(butadiene-farnesene).

A hydrocarbon-based copolymer P according to the invention is obtained in this second variant (either on conclusion of step (ii) or on conclusion of step (iii) depending on the meaning of the pair (G, D) as stated above), the main chain of which copolymer comprises:

the repeating unit of formula (I') and the repeating unit of formula (II') in which $R^0$ represents:

the radical of formula:

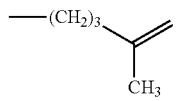

corresponding to α-myrcene;

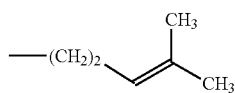

corresponding to β-myrcene; or

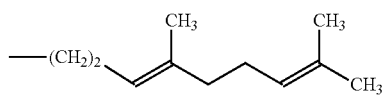

corresponding to β-farnesene.

Compound of Formula (B)

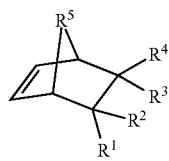

(B)

The use in step (i) of the compound of formula (B) advantageously leads to the production of copolymers P according to the invention whose main chain comprises the additional unit of formula (III'), as defined previously.

The compound of formula (B) generally comprises from 6 to 30 and preferably from 6 to 22 carbon atoms.

Preferably:

$R^1$, $R^2$, $R^3$ and $R^4$ represent a hydrogen atom or an alkyl or alkoxycarbonyl radical comprising from 1 to 14 and even more preferentially from 1 to 8 carbon atoms;

the radical $R^6$ included in the group —$NR^6$, which is one of the meanings of $R^5$, is a linear radical comprising from 1 to 14 carbon atoms.

According to an even more preferred variant:

at most one of the groups taken from ($R^1$, $R^2$, $R^2$ and $R^4$) is a $C_1$-$C_8$ alkoxycarbonyl radical and all the others represent a hydrogen atom; and/or $R^5$ represents a —$CH_2$— radical or an oxygen atom.

The compound of formula (B) is notably chosen from:

norbornene, of the following formula:

norbornadiene, of the following formula:

dicyclopentadiene, of the following formula:

7-oxanorbornene, of the following formula:

7-oxanorbornadiene, of the following formula:

5-ethylidene-2-norbornene, of the following formula:

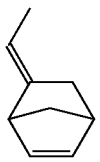

or 5-norbornene-2-methyl acetate, of the following formula:

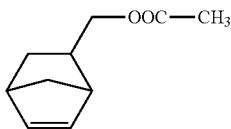

The compound of formula (B) may also be chosen from the compounds having the following formulae:

 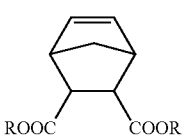

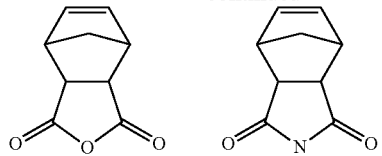

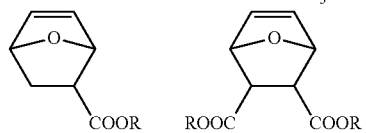

in which R is an alkyl radical comprising from 1 to 22 carbon atoms, preferably from 1 to 14 carbon atoms.

The compound of formula (B) may also be chosen from the group formed by the addition products (or adducts) resulting from the Diels-Alder reaction using cyclopentadiene or furan as starting material, and also norbornene-based compounds, such as the branched norbornenes as described in WO 2001/04173 (such as: norbornene isobornyl carboxylate, norbornene phenyl carboxylate, norbornene ethylhexyl carboxylate, norbornene phenoxyethyl carboxylate and alkyl norbornene dicarboximide, the alkyl usually including from 3 to 8 carbon atoms), and the substituted norbornenes as described in WO 2011/038057 (norbornene dicarboxylic anhydrides and optionally 7-oxanorbornene dicarboxylic anhydrides).

Among the various compounds mentioned of formula (B), the ones most particularly preferred are norbornene and dicyclopentadiene.

Step (ii):

The macrocyclic cooligomers O corresponding to the product formed in step (i) are polymerized by heating to a temperature in a range from 20 to 60° C., in the presence of a chain-transfer agent (also referred to as CTA).

For the preparation of a hydrocarbon-based copolymer P such that the pair (G, D) is (G1, D1), (G3, D3) or (G4, D4), then said CTA is a compound of formula (C):

in which:

$F^1$ and $F^2$ are such that the pair (G, D) corresponds to the corresponding definition (G1, D1), (G3, D3) or (G4, D4);

the ⁓ bond is a carbon-carbon single bond geometrically oriented on one side or the other relative to the double bond (cis or trans).

A hydrocarbon-based copolymer P according to the invention is obtained in this case directly on conclusion of step (ii).

For the preparation of a hydrocarbon-based copolymer P such that the pair (G, D) is (G2, D2), then said CTA is the diepoxy compound of formula (C):

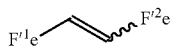

(C')

in which:

F'$^1$e and F'$^2$e are monovalent radicals of formulae (G') and (D'):

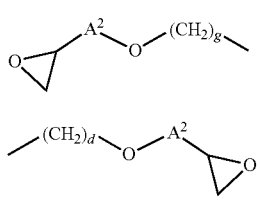

(G')

(D')

the ⁓ bond is a carbon-carbon single bond geometrically oriented on one side or the other relative to the double bond (cis or trans).

An intermediate hydrocarbon-based copolymer I comprising the two end groups F'$^1$e and F'$^2$e, and the main chain of which is identical to that of the copolymer P according to the invention, is obtained in this case directly on conclusion of step (ii).

CTA of Formula (C):

According to a first embodiment, the CTA has the formula (C) in which F$^1$ and F$^2$ are such that the pair (G, D) is (G1, D1).

Said CTA then has the formula:

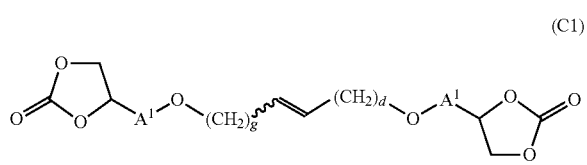

(C1)

According to a preferred variant of said mode, A$_1$ is a methylene group.

According to another preferred variant of said mode, g and d are equal to 1.

The CTA resulting from the combination of these two variants has the formula:

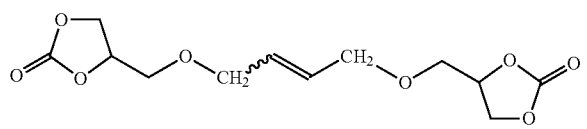

CTA$^1$ and is known as 1,4-bis[(1,3-dioxolan-2-one-4-yl))methyloxy]-2-butene. It is referred to hereinbelow as CTA$^1$.

CTA$^1$ was synthesized according to the procedure described in patent application WO 2016/188875 from Henkel by carbonation with carbon dioxide of the compound of formula:

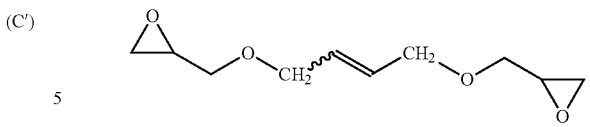

The latter compound, known as 2-butenediol diglycidyl ether, was synthesized according to the procedure described in patent application EP 0 911 326 from Kyowa Yuka, by reaction of two moles of epichlorohydrin with one mole of 1,4-butenediol in the presence of a phase-transfer catalyst.

According to a second embodiment, the CTA has the formula (C) in which F$^1$ and F$^2$ are such that the pair (G, D) is (G3, D3).

Said CTA then has the formula:

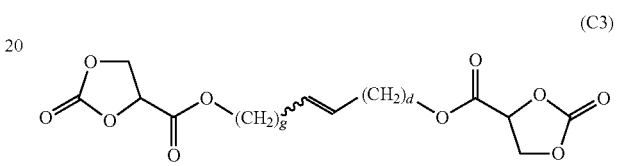

(C3)

According to a preferred variant of said mode, g and d are equal to 1. The CTA corresponding to this last variant is known as: 1,4-bis[(1,3-dioxolan-2-one-4-carboxylate], 2-butene and is referred to hereinbelow as CTA$^3$.

CTA$^3$ may be prepared from an unsaturated linear diol (for example 2-butene-1,4-diol available from Aldrich) and from 2-oxo-1,3-dioxolane-4-carboxylic acid according to the three-step procedure described below which was adapted from patent application WO 2014/206636 in the name of Construction Research & Technology.

Step 1: Controlled oxidation of glyceryl carbonate to 2-oxo-1,3-dioxolane-4-carboxylic acid

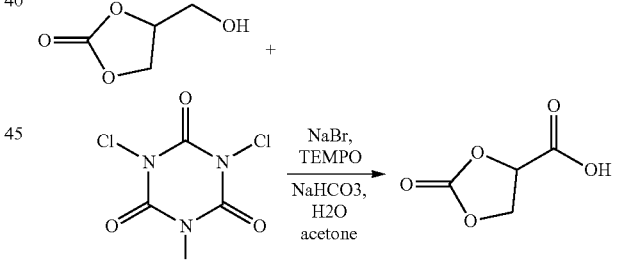

Step 2: Synthesis of 2-oxo-1,3-dioxolan-4-acyl chloride

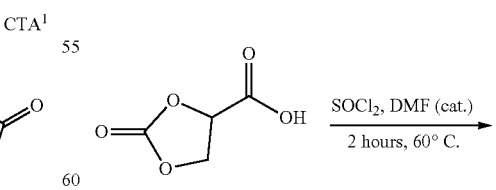

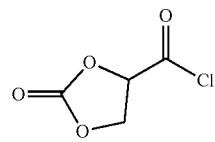

Step 3: Synthesis of the CTA of formula (C3)

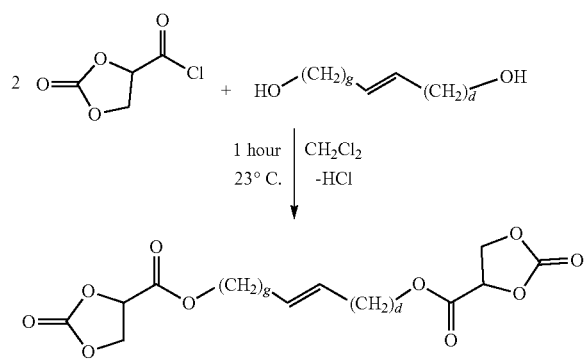

According to a third embodiment, the CTA has the formula (C) in which $F^1$ and $F^2$ are such that the pair (G, D) is (G4, D4).

Said CTA then has the formula:

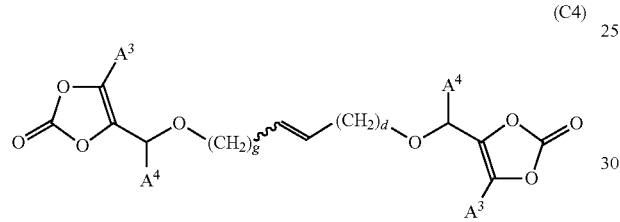

(C4)

According to a preferred variant of said mode, $A^3$ is a methyl and $A^4$ is a hydrogen atom.

According to another preferred variant of said mode, g and d are equal to 1.

The CTA resulting from the combination of these two variants has the formula:

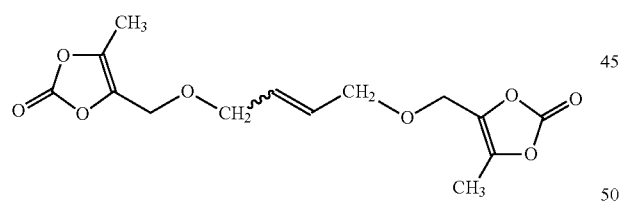

CTA⁴ and is known as 1,4-bis[(1,3-dioxol-2-one-5-methyl-4-yl)methyloxy]-2-butene. It is referred to hereinbelow as CTA⁴.

The CTA of formula (C4) may be obtained according to scheme (1) below, by following the procedure described in U.S. Pat. No. 8,653,126 from Daiichi Sankyo:

Scheme (1)

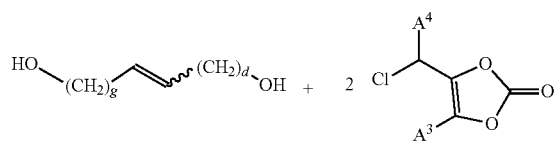

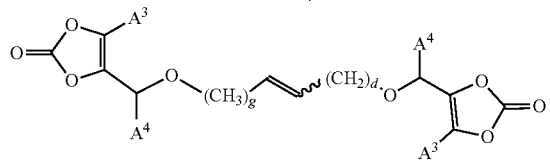

The precursors of 4-halomethyl-5-alkyl-1,3-dioxolen-2-one of the formula below

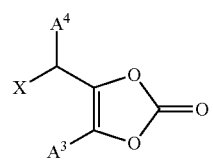

in which X is a chlorine or bromine atom;
were obtained by following the procedures described in patent application EP 0 078 413 from Kanebo.

CTA of formula (C'):
The CTA of formula (C') also corresponds to formula (C2) below:

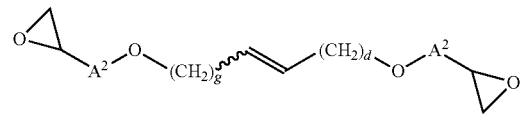

(C2)

According to a preferred variant of said mode, A2 is a methylene group.

According to another preferred variant of said mode, g and d are equal to 1.

The CTA resulting from the combination of these two variants has the formula:

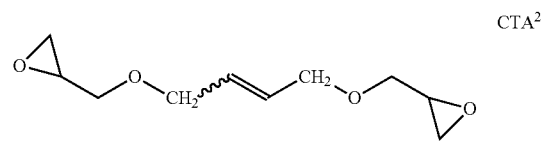 [SMILES: C(=CCOCC1CO1)COCC1CO1]

CTA² and is known as diglycidyl ether. It is referred to hereinbelow as CTA².

As indicated above, this compound may be synthesized according to the procedure described in patent application EP 0 911 326 from Kyowa Yuka, by reacting two moles of epichlorohydrin with one mole of 1,4-butenediol in the presence of a phase-transfer catalyst.

Without being bound by any reaction mechanism, it is estimated that step (ii) involves a polymerization by opening of the macrocycles O and a cross-metathesis with the CTA.

This step (ii) advantageously has low exothermicity, and as such the industrial implementation of the process according to the invention does not pose any temperature control difficulties.

The molar amount of CTA to be introduced into the present step (ii) is linked to the molar amount of bipolymer A and, optionally, to the molar amount of compound B introduced into step (i).

These molar amounts are such that the ratio r which is equal to the ratio of the number of moles of said CTA:
- to the number $N_{(A)}$ of moles of the bipolymer A, in the case where said bipolymer A is the only reagent used in step (i), or
- to the sum of $N_{(A)}$ and of the number of moles $N_{(B)}$ of the compound of formula (B), in the case where the compound of formula (B) is also used in step (i), is in an interval ranging from 0.0010 to 1.0.

Thus, when, in accordance with a preferred variant of the process according to the invention, the bipolymer A is a poly(butadiene-isoprene), said ratio r is equal to the ratio of the number of moles of the CTA:
- to the number $N_{(A)}$ of moles of said poly(butadiene-isoprene), in the case where said poly(butadiene-isoprene) is the only reagent used in step (i), or
- to the sum of $N_{(A)}$ and of the number of moles $N_{(B)}$ of the compound of formula (B), in the case where the compound of formula (B) is also used in step (i).

Even more preferably, the ratio r defined above is in an interval ranging from 0.0020 to 0.3.

Metathesis Catalyst and Solvent Used in Steps (i) and (ii):

Steps (i) and (ii) of the process according to the invention each involve a metathesis catalyst and a solvent which may be identical or different, and preferably identical in each of these two steps.

The metathesis catalyst is preferably a ruthenium-based catalyst and even more preferably a Grubbs catalyst.

Such a catalyst is generally a commercial product.

The metathesis catalyst is generally a transition metal catalyst, notably including a ruthenium-based catalyst, generally in the form of ruthenium complex(es), such as a ruthenium-carbene complex.

According to the invention, the term "Grubbs catalyst" generally means a 1$^{st}$ or 2$^{nd}$ generation Grubbs catalyst, but also any other catalyst of Grubbs type (of ruthenium-carbene type) or Hoveyda-Grubbs type accessible to a person skilled in the art, for instance the substituted Grubbs catalysts described in patent U.S. Pat. No. 5,849,851.

A 1$^{st}$ generation Grubbs catalyst is generally of formula (G1):

(G1)

in which Ph is phenyl, Cy is cyclohexyl and the group P(Cy)$_3$ is a tricyclohexylphosphine group.

The IUPAC name of this compound is: benzylidenebis(tricyclohexylphosphine)dichlororuthenium (of CAS number 172222-30-9). Such a catalyst is notably available from the company Aldrich.

A preferred catalyst is the 2$^{nd}$ generation (or G2) Grubbs catalyst of formula (G2):

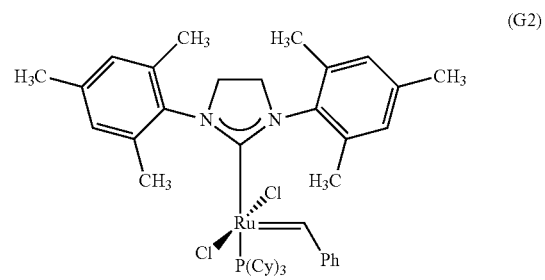

(G2)

in which Ph is phenyl and Cy is cyclohexyl.

The IUPAC name of the second generation of this catalyst is benzylidene[1,3-bis(2,4,6-trimethylphenyl)-2-imidazolidinylidene]dichloro(tricyclohexylphosphine)ruthenium (of CAS number 246047-72-3). This catalyst is also available from the company Aldrich.

The solvent is generally chosen from the group formed by the aqueous or organic solvents typically used in polymerization reactions and which are inert under the polymerization conditions, such as aromatic hydrocarbons, chlorinated hydrocarbons, ethers, aliphatic hydrocarbons, alcohols, water or mixtures thereof.

A preferred solvent is chosen from the group formed by benzene, toluene, para-xylene, methylene chloride (or dichloromethane), 1,2-dichloroethane, dichlorobenzene, chlorobenzene, tetrahydrofuran, diethyl ether, pentane, hexane, heptane, a mixture of liquid isoparaffins (for example Isopar®), methanol, ethanol, water or mixtures thereof.

Even more preferably, the solvent is chosen from the group formed by benzene, toluene, para-xylene, methylene chloride, 1,2-dichloroethane, dichlorobenzene, chlorobenzene, tetrahydrofuran, diethyl ether, pentane, hexane, heptane, methanol, ethanol or mixtures thereof.

Even more particularly preferably, the solvent is dichloromethane, 1,2-dichloroethane, toluene, heptane or a mixture of toluene and 1,2-dichloroethane.

It is also possible for each of the steps (i) and (ii) to be performed without solvent.

The main chain of the hydrocarbon-based copolymer P according to the invention that is obtained directly on conclusion of steps (i) and (ii) is unsaturated, and, more precisely, comprises—in accordance with the first embodiment described previously for said copolymer—a unit (I) of formula (I') repeated p' times, a unit (II) of formula (II') repeated n' times and, optionally, a unit (III) of formula (III') repeated m' times.

Step (iii):

In accordance with the process for preparing a hydrocarbon-based copolymer P such that the pair (G, D) is (G2, D2), the diepoxy CTA of formula (C') is used in step (ii). An intermediate hydrocarbon-based copolymer I comprising the two end groups F'$^1$e and F'$^2$e and the main chain of which is identical to that of the copolymer P according to the invention, is obtained in this case directly on conclusion of step (ii).

Said intermediate copolymer I is then reacted, in accordance with the present step (iii) in a dithiocarbonation with carbon disulfide (CS$_2$) in the presence of a halogenated lithium compound, at a temperature ranging from 10 to 45° C.

At the end of this reaction, the hydrocarbon-based copolymer P such that the pair (G, D) is (G2, D2) is then obtained.

The process for preparing the hydrocarbon-based copolymer P that has just been described may also comprise, besides steps (i) and (ii), and optionally (iii), an additional step of hydrogenation of the double bonds.

This step is generally performed by catalytic hydrogenation, usually under hydrogen pressure and in the presence of a hydrogenation catalyst, such as a catalyst of palladium supported on carbon (Pd/C). It makes it possible more particularly to obtain for the hydrocarbon-based copolymer P—in accordance with the second embodiment described previously for said copolymer—a main chain which is saturated, and which thus comprises a unit (I) of formula ($I^H$) repeated p times, a unit (II) of formula ($II^H$) repeated n times and, optionally, a unit (III) of formula ($III^H$) repeated m times.

In accordance with a preferred variant of the preparation process according to the invention, said process consists essentially of steps (i), (ii) and, where appropriate, (iii). This variant makes it possible to obtain for the hydrocarbon-based copolymer P, in accordance with the first embodiment described previously for said copolymer, an unsaturated main chain, which thus comprises a unit (I) of formula (I'), a unit (II) of formula (II') and, optionally, a unit (III) of formula (III').

The invention also relates to the use, as adhesive, of the hydrocarbon-based polymer comprising two end groups of cyclocarbonate or similar type, as defined previously, as a mixture with an amine compound comprising at least two amine groups, for example chosen from diamines, triamines and higher homologues. The amounts of the hydrocarbon-based polymer and of the amine compound correspond to stoichiometric amounts, i.e. the mole ratio of the number of cyclocarbonate (or similar) groups to the number of amine groups ranges from 0.8 to 1.2, preferably from 0.9 to 1.1, or even is about 1.0.

In practice, the hydrocarbon-based polymer and the amine compound, used as curing agent, are advantageously each included in a component of a two-component composition which is made available to the user. Said user thus, at the time of use of the adhesive, mixes these two components, optionally under hot conditions, so as to obtain a liquid adhesive composition of suitable viscosity.

The invention also relates to a process for assembling two substrates by bonding, comprising:
coating at least one of the two substrates to be assembled with a liquid adhesive composition obtained by mixing an amine compound comprising at least two amine groups with the hydrocarbon-based polymer comprising two end groups of cyclocarbonate or similar type as defined previously; and then
actually bringing the two substrates into contact.

The liquid adhesive composition is either the adhesive composition comprising said compound and said polymer in the liquid state at room temperature, or the hot-melt adhesive composition. A person skilled in the art is capable of working so that the adhesive composition used is in liquid form and at a suitable viscosity at the time of its use.

Coating with the liquid adhesive composition is preferably performed in the form of a layer with a thickness within a range from 0.3 to 5 mm, preferably from 1 to 3 mm, on at least one of the two surfaces which respectively belong to the two substrates to be assembled and which are intended to be brought into contact with each other along a contact surface. The actual bringing into contact of the two substrates is then performed along their contact surface.

Needless to say, the coating operation and the contacting operation have to be performed within a compatible time interval, as is well known to those skilled in the art, i.e. before the adhesive layer applied to the substrate loses its ability to attach, by adhesive bonding, this substrate to another substrate. In general, the polycondensation of the hydrocarbon-based polymer with the amine compound begins to take place during the coating operation and then continues to take place during the step in which the two substrates are brought into contact.

The appropriate substrates are, for example, inorganic substrates, such as glass, ceramics, concrete, metals or alloys (such as aluminium alloys, steel, non-ferrous metals and galvanized metals); or else organic substrates, such as wood, plastics, such as PVC, polycarbonate, PMMA, polyethylene, polypropylene, polyesters or epoxy resins; substrates made of metal and composites coated with paint (as in the motor vehicle field).

The examples that follow are given purely by way of illustration of the invention and should not be interpreted in order to limit the scope thereof.

The copolymers P illustrated have a Brookfield viscosity at 23° C. of less than 50 Pa·s.

Example 1: depolymerization/cyclization by heating a liquid poly(butadiene-isoprene), followed by hot cross-metathesis in the presence of $CTA^1$ and production of a copolymer P such that (G, D) is (G1, D1):

Kuraprene® LIR-390 as defined previously is used as liquid poly(butadiene-isoprene), and, as chain-transfer agent, the $CTA^1$ having the formula:

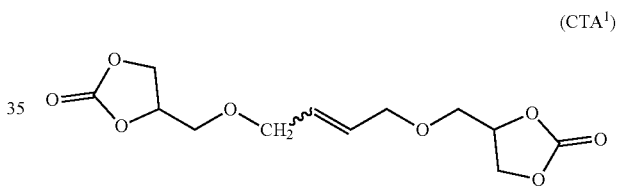
($CTA^1$)

Step (i):
The poly(butadiene-isoprene) (81.00 mmol) and dry $CH_2Cl_2$ (9 ml) are introduced into a 20 ml round-bottomed flask in which was also placed a Teflon®-coated magnetic stirring bar. The flask and its contents are subsequently placed under argon.

The catalyst G2 defined previously (9.6 μmol) dissolved in $CH_2Cl_2$ (2 ml) is then added using a cannula.

This mixture is heated in an oil bath for 3 hours at 40° C. with stirring until the Kuraprene®LIR-390 has disappeared and a mixture of macrocyclic cooligomers O has formed, as attested to by size exclusion chromatography.

Step (ii):
The compound $CTA^1$ (0.27 mmol) is added by syringe and with stirring to the mixture contained in the flask from step (i) and heating is continued at a temperature of 40° C.

The ratio r, as defined previously, is: 0.27/81.00, i.e. 0.003

After 8 hours, with effect from the addition of the $CTA^1$, the product present in the flask is extracted after evaporation of the solvent under vacuum. This product is then recovered in the form of a colourless liquid, after precipitating from methanol, filtering and drying at 23° C. under vacuum, in a yield of greater than 90%.

Analysis by 1H/13C NMR gives the following results:
$^1$H NMR (CDCl$_3$, 500 MHz, 298 K): δ (ppm) repeating unit 1.09 (s, CH$_3$ isoprene unit), 2.06 and 2.11 (m, CH$_2$/ isoprene and butadiene units), 5.41 and 5.45 (m, CH═CH cis and trans/butadiene unit), 4.95 and 4.99 (m, CH═C (CH₃) cis and trans/isoprene unit), end group=3.87 (d, O—C(O)—O—CH—CH₂—O—CH₂—CH=CH), 4.02 (d, O—C (O)—O—CH—CH₂—O—CH₂—CH=CH), 4.46 (dd, O—C(O)—O—CH₂—CH—CH₂—O—CH₂CH=CH), 4.65 (m, O—C(O)—O—CH—CH₂—O—CH₂—CH=CH), 5.47 (m, O—C(O)—O—CH—CH₂—O—CH₂CH=CH—).

¹³C NMR (CDCl₃, 100 MHz, 298 K): δ (ppm) repeating unit 20.0, 27.4, 32.7, 37.4, 41.8, 124.2, 126.2, 131.4, end group=71.8 O—C(O)—O—CH—CH₂—O—CH₂—CH=CH, 66.2 O—C(O)—O—CH₂—CH—CH₂—O—CH₂—CH=CH, 71.6 O—C(O)—O—CH₂—CH—CH₂—O—CH₂—CH=CH, 74.1 O—C(O)—O—CH—CH₂—O—CH₂—CH=CH, 125.3 O—C(O)—O—CH—CH₂—O—CH₂—CH=CH, 133.8 O—C(O)—O—CH—CH₂—O—CH₂—CH=CH, 154.7 O—C(O)—O—CH—CH₂—O—CH₂—CH=CH.

These values confirm that the product obtained is a copolymer comprising two cyclocarbonate end groups, the main chain of which consists essentially:
of unit (I) of formula:

and
of unit (II) of formula:

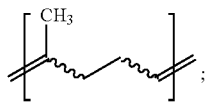

and
of which two units (I) are each connected to one of the two end groups of formulae:

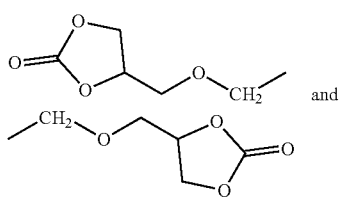

The number-average molecular mass Mn and the polydispersity index are, respectively, 17 200 g/mol and 2.7.

Example 2: depolymerization/cyclization by heating a poly(butadiene-isoprene), followed by cross-metathesis in the presence of CTA² and then dithiocarbonation, and production of a copolymer P such that (G, D) is (G2, D2):

Steps (i) and (ii):
Example 1 is repeated, replacing, as chain-transfer agent, CTA¹ with CTA² of formula:

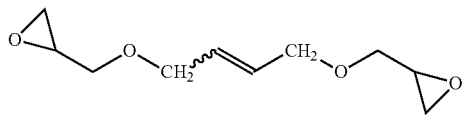 [SMILES: C(=CCOCC1CO1)COCC1CO1]

Step (iii):
The isolated product, derived from steps (i) and (ii), lithium bromide (10.00 mmol) and dry THF (10 ml) were placed in a 20 ml round-bottomed flask in which was also placed a Teflon®-coated magnetic stirring bar. The flask and its contents were then placed under argon. Carbon sulfide (20.00 mmol) was then introduced dropwise by syringe into the flask. The flask was then immersed in an oil bath at 40° C. for 17 hours. A product was recovered after precipitating from methanol (20 ml), filtering and drying at 23° C. under vacuum.

A polymer is also recovered in liquid form, the ¹H NMR/¹³C NMR analysis of which gives the following values:

¹H NMR (CDCl₃, 500 MHz, 298 K): δ (ppm) repeating unit 1.09 (s, CH₃ isoprene unit), 2.06 and 2.11 (m, CH₂/isoprene and butadiene units), 5.41 and 5.45 (m, CH=CH cis and trans/butadiene unit), 4.95 and 4.99 (m, CH=C (CH₃) cis and trans/isoprene unit), end group=3.86 (d, S—C(S)—O—CH—CH₂—O—CH₂—CH=CH), 3.85 (d, S—C(S)—O—CH—CH₂—O—CH₂—CH=CH), 3.52 (dd, O—C(S)—S—CH₂—CH—CH₂—O—CH₂—CH=CH), 4.44 (m, S—C(S)—O—CH—O—CH₂—O—CH₂—CH=CH), 5.48 (m, S—C(S)—O—CH—CH2—O—CH₂—CH=CH—).

¹³C NMR (CDCl₃, 100 MHz, 298 K): δ (ppm) repeating unit 20.0, 27.4, 32.7, 37.4, 41.8, 124.2, 126.2, 131.4, end group=71.8 S—C(S)—O—CH—CH₂—O—CH₂—CH=CH, 34.00—C(S)S—CH₂—CH—CH₂—O—CH₂—CH=CH, 66.7 O—C(S)S—CH₂—CH—CH₂—O—CH₂—CH=CH, 83.9 S—C(S)—O—CH—CH2—O—CH₂—CH=CH, 125.3 S—C(S)—O—CH—CH₂—O—CH₂—CH=CH, 133.8 S—C(S)—O—CH—CH₂—O—CH₂—CH=CH, 205.1 S—C(S)—O—CH—CH₂—O—CH₂—CH=CH.

These values confirm that the product obtained is a copolymer comprising two dithiocyclocarbonate end groups, the main chain of which consists essentially of:
the unit (I) of formula:

and
the unit (II) of formula:

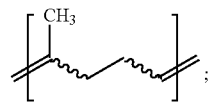

and
two units (I) of which are each connected to one of the two end groups of formulae:

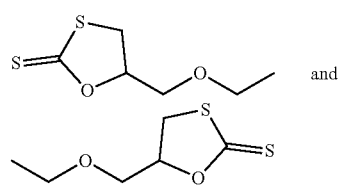

The number-average molecular mass Mn and the polydispersity index are, respectively, 17 050 g/mol and 2.80.

Example 3: depolymerization/cyclization by heating a liquid poly(butadiene-isoprene), followed by hot cross-metathesis in the presence of CTA³ and production of a copolymer P such that (G, D) is G3, D3):

Example 1 is repeated, replacing, as chain-transfer agent, CTA¹ with CTA³, of formula:

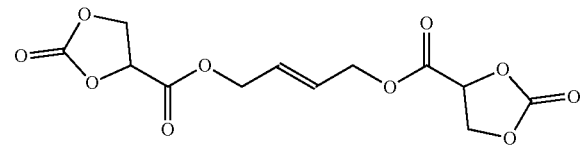

(CTA³)

A polymer in the form of a liquid is also recovered, the ¹H/¹³C NMR analysis of which gives the following values:

¹H NMR (CDCl₃, 500 MHz, 298 K): δ (ppm) repeating unit 1.09 (s, CH₃ isoprene unit), 2.06 and 2.11 (m, CH₂/isoprene and butadiene units), 5.41 and 5.45 (m, CH=CH cis and trans/butadiene unit), 4.95 and 4.99 (m, CH=C (CH3) cis and trans/isoprene unit), end group=4.67 (d, O—C(O)—O—CH—C(=O)—O—CH₂—CH=CH), 4.54 (dd, O—C(O)—O—CH₂—CH(=O)—O—CH₂—CH=CH), 5.03 (dd, O—C(O)—O—CH—C(=O)—O—CH₂—O—CH₂—CH=CH), 5.53 (m, O—C(O)—O—CH—C(=O)—O—CH₂—CH=CH—).

¹³C NMR (CDCl₃, 100 MHz, 298 K): δ (ppm) repeating unit 20.0, 27.4, 32.7, 37.4, 41.8, 124.2, 126.2, 131.4, end group=64.0 O—C(O)—O—CH—C(=O)—O—CH₂—CH=CH, 68.4 —O—C(O)—O—CH₂—CH—C(=O)—O—CH₂—CH=CH, 74.2 O—C(O)—O—CH—C(=O)—O—CH₂—CH=CH, 124.3 O—C(O)—O—CH—C(=O)—O—CH₂—CH=CH, 133.8 O—C(O)—O—CH—C(=O)—O—CH₂—CH=CH, 155.8 O—C(O)—O—CH—C(=O)—O—CH₂—CH=CH, 171.5 O—C(O)—O—CH₂—CH—C(=O)—O—CH₂—CH=CH.

These values confirm that the product obtained is a copolymer comprising two cyclocarbonate end groups, the main chain of which consists essentially of:

the unit (I) of formula:

and the unit (II) of formula:

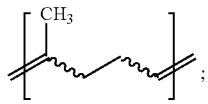

and two units (I) of which are each connected to one of the two end groups of formulae:

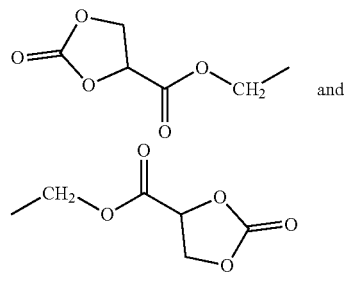

The number-average molecular mass Mn and the polydispersity index are, respectively, 22 700 g/mol and 2.80.

Example 4: depolymerization/cyclization by heating a liquid poly(butadiene-isoprene), followed by hot cross-metathesis in the presence of CTA⁴ and production of a copolymer P such that (G, D) is (G4, D4):

Example 1 is repeated, replacing, as chain-transfer agent, CTA¹ with CTA⁴, of formula:

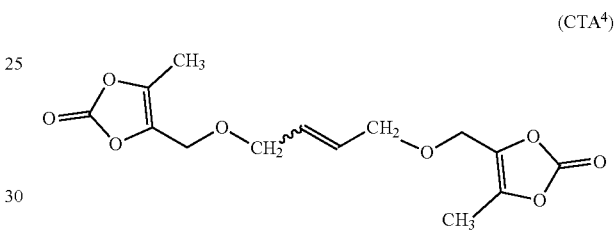

(CTA⁴)

A polymer in the form of a liquid is also recovered, the ¹H/¹³C NMR analysis of which gives the following values:

¹H NMR (CDCl₃, 500 MHz, 298 K): δ (ppm) repeating unit 1.09 (s, CH₃ isoprene unit), 2.06 and 2.11 (m, CH₂/isoprene and butadiene units), 5.41 and 5.45 (m, CH=CH cis and trans/butadiene unit), 4.95 and 4.99 (m, CH=C (CH3) cis and trans/isoprene unit), end group=2.31 (s, O—C(O)—O—C(CH₃)=C—CH₂—O—CH₂—CH=CH), 3.89 (d, O—C(O)—O—C(CH₃)=C—CH₂—O—CH₂—CH=CH), 4.02 (s, O—C(O)—O—C(CH₃)=C—CH₂—O—CH₂—O—CH₂—CH=CH), 5.47 (m, O—C(O)—O—C(CH₃)=C—CH₂—O—CH₂CH=CH).

¹³C NMR (CDCl₃, 100 MHz, 298 K): δ (ppm) repeating unit 20.0, 27.4, 32.7, 37.4, 41.8, 124.2, 126.2, 131.4, end group=10.5 O—C(O)—O—C—CH(CH₃)=C—CH₂—O—CH₂—CH=CH, 62.9 O—C(O)—O—C(CH₃)=C—CH₂—O—CH₂—CH=CH, 71.8 O—C(O)—O—C(CH₃)=C—CH₂—O—CH₂—CH=CH, 125.3 O—C(O)—O—C(CH₃)=C—CH₂—O—CH₂—CH=CH, 133.8 O—C(O)—O—C(CH₃)=C—CH₂—O—CH₂—CH=CH, 144.3 O—C(O)—O—C(CH₃)=C—CH₂—O—CH₂—CH=CH, 153.0 O—C(O)—O—C(CH₃)=C—CH₂—O—CH₂—CH=CH. 155.7 O—C(O)—O—C(=C)—CH₂—O—CH₂—CH=CH.

These values confirm that the product obtained is a copolymer comprising two cyclocarbonate-like end groups, the main chain of which consists essentially:

of unit (I) of formula:

and
of unit (II) of formula:

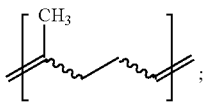

and
of which two units (I) are each connected to one of the two end groups of formula:

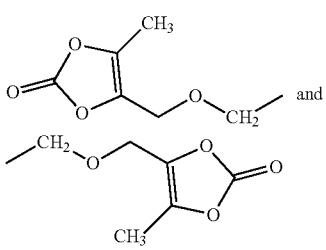

The number-average molecular mass Mn and the polydispersity index are, respectively, 17 020 g/mol and 2.80.

Example 5: depolymerization/cyclization by heating poly(butadiene-isoprene) in the presence of norbornene, followed by cross-metathesis in the presence of CTA[4]:

Example 4 is repeated, the 81.00 mmol of poly(butadiene-isoprene) being replaced in step (i) with a mixture of 41.00 mmol of poly(butadiene-isoprene) and of 40.00 mmol of norbornene, of formula:

available from the company Sigma-Aldrich.

The ratio r of the reagents, as defined previously, is equal to 0.27 mmol divided by 41.00 mmol +40.00 mmol, i.e. 0.003.

After 8 hours, with effect from the addition of the CTA[4], the product present in the flask is extracted after evaporation of the solvent under vacuum. The product is then recovered in a form that is liquid at room temperature, after precipitating from methanol, filtering and drying at 23° C. under vacuum, in a yield of greater than 90%.

A polymer is also recovered in liquid form, the $^1$H NMR/$^{13}$C NMR analysis of which gives the following values:

$^1$H NMR (CDCl$_3$, 500 MHz, 298 K): δ (ppm) repeating unit 1.09 (s, CH$_3$ isoprene unit), 2.06 and 2.11 (m, CH$_2$/isoprene and butadiene units), 5.41 and 5.45 (m, CH=CH cis and trans/butadiene unit), 4.95 and 4.99 (m, CH=C (CH$_3$) cis and trans/isoprene unit), end group=2.31 (s, O—C(O)—O—C(CH$_3$)=C—CH$_2$—O—CH$_2$—CH=CH), 3.89 (d, O—C(O)—C(CH$_3$)=C—CH$_2$—O—CH$_2$—CH=CH), 4.02 (s, O—C(O)—O—C(CH$_3$)=C—CH$_2$—O—CH$_2$—CH=CH), 5.47 (m, O—C(O)—O—C(CH$_3$)=C—CH$_2$—O—CH$_2$—CH=CH).

$^{13}$C NMR (CDCl$_3$, 100 MHz, 298 K): δ (ppm) repeating unit 20.0, 27.4, 32.7, 37.4, 41.8, 124.2, 126.2, 131.4, end group=10.5   O—C(O)—O—CH(CH$_3$)=C—CH$_2$—O—CH$_2$—CH=CH, 62.9   O—C(O)—O—C(CH$_3$)=C—CH$_2$—O—CH$_2$—CH=CH, 71.8 O—C(O)—O—C(CH$_3$)=C—CH$_2$—O—CH$_2$—CH=CH, 125.3 O—C(O)—O—C(CH$_3$)=C—CH$_2$—O—CH$_2$—CH=CH, 133.8 O—C(O)—O—C(CH$_3$)=C—CH$_2$—O—CH$_2$—CH=CH, 144.3 O—C(O)—O—C(CH$_3$)=C—CH$_2$—O—CH$_2$—CH=CH, 153.0 O—C(O)—O—C(CH$_3$)=C—CH$_2$—O—CH$_2$—CH=CH. 155.7    O—C(O)—O—C(=C)—CH$_2$—O—CH$_2$—CH=CH.

These values confirm that the polymer obtained is a copolymer comprising two cyclocarbonate-like end groups, the main chain of which consists essentially:
of unit (I) of formula:

of unit (II) of formula:

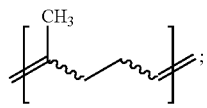

and
of unit (III) of formula:

and
of which two units (I) are each connected to one of the two end groups of formula:

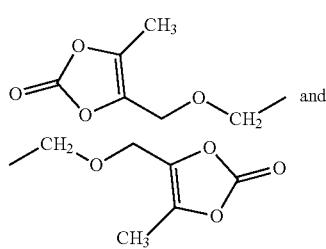

The number-average molecular mass Mn and the polydispersity index are, respectively, 22 390 g/mol and 2.80.

Example 6: Synthesis of a polyurethane starting from the liquid unsaturated polyolefin bearing a cyclocarbonate end group of Example 1:

The polyolefin of Example 1 was reacted at 80° C., in a stoichiometric ratio, with a primary diamine of polyetherdiamine type (Jeffamine EDR 176, Huntsman), until complete disappearance of the infrared band characteristic of the 1,3-dioxolan-2-one groups (at 1800 cm$^{-1}$) and appearance of the bands characteristic of the carbamate bond (band at 1700 cm$^{-1}$).

The reaction time recorded for complete disappearance of the infrared band characteristic of the 1,3-dioxolan-2-one groups was about 3 hours.

Example 7: Synthesis of a poly(thio)urethane starting from the liquid unsaturated polyolefin bearing a dithiocyclocarbonate end group of Example 2:

The liquid unsaturated polyolefin bearing a dithiocyclocarbonate end group of Example 2 was reacted at 23° C., in a stoichiometric ratio, with a primary diamine of polyetherdiamine type (Jeffamine EDR 176, Huntsman), until total disappearance of the infrared band characteristic of the 2-thione-1,3-oxathiolan-4-yl groups (CS band at 1200 cm$^{-1}$ in infrared) and appearance of the bands characteristic of the thiocarbamate bond (C=S band at 1530 cm$^{-1}$ in infrared) and of the thiol and disulfide functions (SH band at 2500 cm$^{-1}$ and S-S band at 510 cm$^{-1}$ in Raman).

The reaction time was about 3 hours.

Example 8: Synthesis of a polyurethane starting from the liquid unsaturated polyolefin bearing a cyclocarbonate end group of Example 3:

Example 7 is repeated, replacing the polyolefin of Example 2 with the liquid unsaturated polyolefin bearing a cyclocarbonate end group of Example 3.

The same result is obtained.

Example 9: Synthesis of a polyurethane starting from the liquid unsaturated polyolefin bearing a 2-oxo-1,3-dioxolen-4-yl end group of Example 4:

Example 7 is repeated, replacing the polyolefin of Example 2 with the liquid unsaturated polyolefin bearing a 2-oxo-1,3-dioxolen-4-yl end group of Example 4, and until total disappearance of the infrared band characteristic of the 1,3-dioxol-2-one groups (at 1800 cm$^{-1}$) and appearance of the bands characteristic of the 2-oxazolidinone groups (band between 1770 and 1780 cm$^{-1}$) resulting from rapid post-cyclization of the keto-carbamates obtained previously.

The reaction time was about 3 hours.

The invention claimed is:

1. A hydrocarbon-based copolymer P comprising two end groups $F^1$ and $F^2$ of cyclocarbonate and similar type, having the respective formulae:

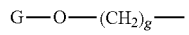
(G)

and

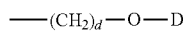
(D)

in which:
  g and d, which may be identical or different, represent an integer equal to 1, 2 or 3; and
  G and D are two monovalent radicals such that the pair (G, D) is as follows:
  (G1, D1) of formulae:

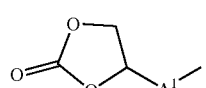
(G1)

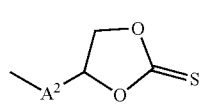
(D1)

in which $A^1$ is an alkylene group of 1 to 9 carbon atoms;

(G2, D2) of formulae:

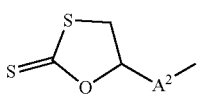
(G2)

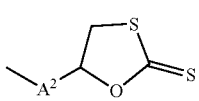
(D2)

in which $A^2$ is an alkylene group of 1 to 9 carbon atoms;

(G3, D3) of formulae:

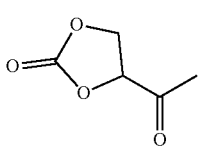
(G3)

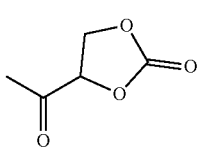
(D3)

(G4, D4) of respective formulae:

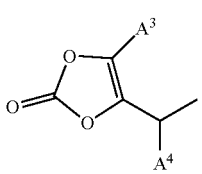
(G4)

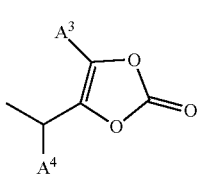
(D4)

in which:
  $A^3$ and $A^4$, which may be identical or different, each represent a hydrogen atom, a linear or branched alkyl radical comprising from 1 to 6 carbon atoms, a cycloalkyl radical of 5 or 6 carbon atoms, a phenyl radical or an alkylphenyl group, the alkyl chain of which has 1 to 4 carbon atoms;
  $A^3$ and $A^4$ also possibly being bonded together to form a group —(CH$_2$-)$_q$- in which q is an integer ranging from 3 to 5;
wherein the main chain of said copolymer P comprises:
  a unit (I) of formula (I') repeated p times, p being an integer other than 0:

(I')

a unit (II) of formula (II') repeated n times, n being an integer other than 0:

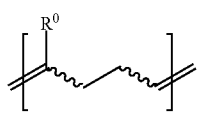
(II')

in which $R^0$ represents the methyl radical or one of the three radicals having the following formula:

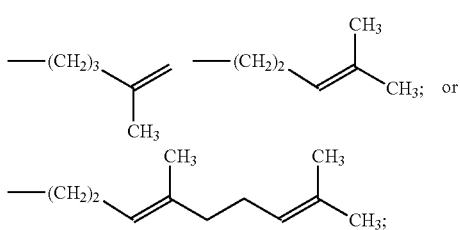

wherein the ⁓⁓⁓ bond is a single bond geometrically oriented on one side or the other relative to the double bond (cis or trans),
on the p units of formula (I'), p" also correspond to formula (I"), p" being an integer other than 0, less than p and such that p"/p is greater than 0.8:

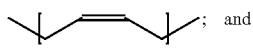
(I")

on the n units of formula (II'), n" also correspond to formula (II"), n" being an integer other than 0, less than n and such that n"/n is greater than 0.9:

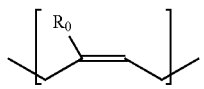
(II")

and wherein the main chain of copolymer P optionally comprises a unit (III) of formula (III) repeated m times, m being an integer greater than or equal to 0:

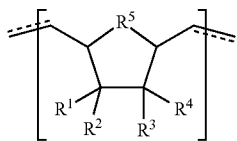
(III)

in which:
$R^1$, $R^2$, $R^3$ and $R^4$, which may be identical or different, represent:
a hydrogen or halogen atom; or
a radical of 1 to 22 carbon atoms which is alkyl, alkenyl, alkoxycarbonyl, alkenyloxycarbonyl, alkylcarbonyloxy, alkenylcarbonyloxy or alkylcarbonyloxyalkyl, the hydrocarbon-based chain of said radical possibly being optionally interrupted with at least one oxygen atom or one sulfur atom; in addition:
at least one of the groups $R^1$ to $R^4$ can form, with at least one other of the groups $R^1$ to $R^4$ and with the carbon atom or atoms to which said groups are linked, a 3- to 10-membered, optionally substituted, saturated or unsaturated hydrocarbon-based ring or heterocycle; and
at least one of the pairs ($R^1$, $R^2$) and ($R^3$, $R^4$) can form, with the carbon atom to which said pair is linked, a group of two carbon atoms linked by a double bond: C=C, the other carbon atom of which bears two substituents that are a hydrogen atom or a $C_1$-$C_4$ alkyl radical; and
the carbon atom bearing one of the groups of the pair ($R^1$, $R^2$) may be linked to the carbon atom bearing one of the groups of the pair ($R^3$, $R^4$) by a double bond, it being understood that, in accordance with the valency rules, only one of the groups of each of these two pairs is then present;
$R^5$ represents:
an oxygen or sulfur atom, or
a divalent radical —$CH_2$—, —C(=O)— or —$NR^6$— in which $R^6$ is an alkyl or alkenyl radical of 1 to 22 carbon atoms;
the bond ===== represents a single bond or a double bond;
$F^1$ and $F^2$ are each linked to one of the two ends of the main chain and to a unit (I); and
n, p and m are such that the number-average molecular mass Mn of the copolymer P is within a range extending from 400 to 100 000 g/mol and its polydispersity index is within a range extending from 1.5 to 3.0.

2. The copolymer P according to claim 1, having a main chain consisting essentially of the repeating unit (I) of formula (I') of the repeating unit (II) of formula (II') and, optionally, of the repeating unit (III) of formula (III) and in that the number p of units (I) and the number n of units (II) are such that:
p/(n+p) is between 45% and 95%, and
n/(n+p) is between 5% and 55%.

3. The copolymer P according to claim 1, wherein the unit (III) has the formula (III'):

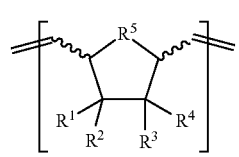
(III')

wherein the ⁓⁓⁓ bond is a single bond geometrically oriented on one side or the other relative to the double bond (cis or trans).

4. The copolymer P according to claim 1, wherein the radical $R^0$ of the unit (II') represents a methyl radical.

5. The copolymer P according to claim 1, wherein $F^1$ and $F^2$ have the respective formulae:

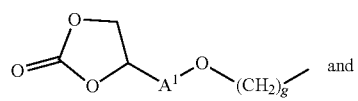

-continued

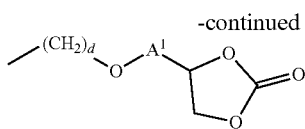

in which:
A$^1$ is a methylene group; and
g and d are equal to 1.

6. The copolymer P according to claim 1, wherein F$^1$ and F$^2$ have the respective formulae:

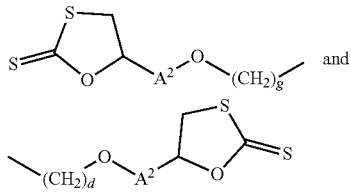

in which:
A$^2$ is a methylene group; and
g and d are equal to 1.

7. The copolymer P according to claim 1, wherein F$^1$ and F$^2$ have the respective formulae:

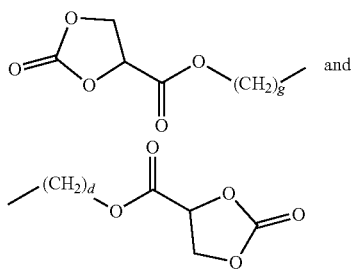

in which g and d are equal to 1.

8. Copolymer P according to claim 1, wherein F$^1$ and F$^2$ have the respective formulae:

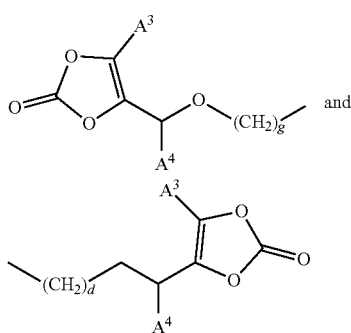

in which:
A$^3$ is a methyl, A$^4$ is a hydrogen atom; and
g and d are equal to 1.

9. A process for preparing the hydrocarbon-based copolymer P as defined in claim 1, said process comprising:
(i) heating at a temperature ranging from 30° C. to 80° C.:
(a) of a statistical bipolymer A that is a poly(butadiene-isoprene), a poly(butadiene-myrcene) or a poly(butadiene-farnesene);

(b) optionally in the presence of a compound B of formula (B):

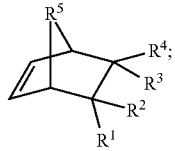

and then
(ii) heating the product formed in (i) to a temperature in a range from 20 to 60° C., in the presence of a chain-transfer agent (also referred to as CTA), wherein:
(c) when said hydrocarbon-based copolymer P is such that the pair (G, D) is (G1, D1), (G3, D3) or (G4, D4), then said CTA is a compound of formula (C):

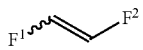

in which:
F$^1$ and F$^2$ are such that the pair (G, D) corresponds to the corresponding definition (G1, D1), (G3, D3) or (G4, D4);
the ∼∼∼ bond is a carbon ꟷ carbon single bond geometrically oriented on one side or the other relative to the double bond (cis or trans); and
(d) when said hydrocarbon-based copolymer P is such that the pair (G, D) is (G2, D2), then said CTA is the diepoxy compound of formula (C'):

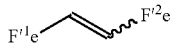

in which:
F'$^1$e and F'$^2$e are monovalent radicals of formulae (G') and (D'):

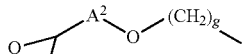

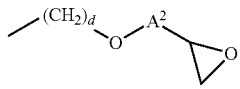

the ∼∼∼ bond is a carbon ꟷ carbon single bond geometrically oriented on one side or the other relative to the double bond (cis or trans);
each of (i) and (ii) is performed in the presence of a metathesis catalyst and of a solvent;
and then
(iii) when said hydrocarbon-based copolymer P is such that the pair (G, D) is (G2, D2), a step of dithiocarbonation of the polymer obtained in (ii), by reaction with carbon disulfide (CS$_2$) in the presence of a halogenated lithium compound, at a temperature ranging from 10 to 45° C.

10. The process according to claim 9, wherein the bipolymer A used in (i) is a poly(butadiene-isoprene).

11. The process according to claim 10, wherein the chain of the poly(butadiene-isoprene) used in (i) comprises:
   less than 5% by number of vinyl-1,2 butadiene units on the basis of the number of butadiene-based units, and
   less than 5% of the total number of vinyl-1,2 isoprene units and of vinyl-3,4 isoprene units on the basis of the number of isoprene-based units.

12. The process according to claim 10, wherein the chain of the poly(butadiene-isoprene) used in (i) comprises:
   at least 80% by number of cis-1,4 butadiene units on the basis of the number of butadiene-based units, and
   at least 90% by number of cis-1,4 isoprene units on the basis of the number of isoprene-based units.

13. A mixture functional as an adhesive comprising the hydrocarbon-based polymer as defined in claim 1 and an amine compound comprising at least two amine groups.

14. A process for assembling two substrates by bonding, comprising:
   coating at least one of the two substrates to be assembled with a liquid adhesive composition obtained by mixing an amine compound comprising at least two amine groups with the hydrocarbon-based polymer as defined in claim 1; and then
   actually bringing the two substrates into contact.

15. The process according to claim 10, wherein the bipolymer A used in (i) is a poly(butadiene-isoprene) with 45% to 95% by number of butadiene-based units and 5% to 55% by number of isoprene-based units, said percentages being expressed on the basis of the total number of constituent units of the poly(butadiene-isoprene) chain.

16. A hydrocarbon-based copolymer P comprising two end groups $F^1$ and $F^2$ of cyclocarbonate and similar type, having the respective formulae:

$$G\text{—}O\text{—}(CH_2)_g\text{—} \quad \text{and} \quad \tag{G}$$

$$\text{—}(CH_2)_d\text{—}O\text{—}D \tag{D}$$

in which:
   g and d, which may be identical or different, represent an integer equal to 1, 2 or 3; and
   G and D are two monovalent radicals such that the pair (G, D) is as follows:
   (G1, D1) of formulae:

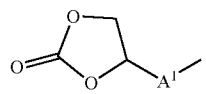
(G1)

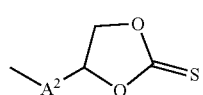
(D1)

in which $A^1$ is an alkylene group of 1 to 9 carbon atoms;
(G2, D2) of formulae:

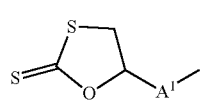
(G2)

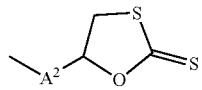
(D2)

in which $A^2$ is an alkylene group of 1 to 9 carbon atoms;
(G3, D3) of formulae:

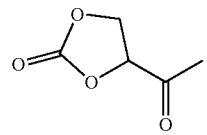
(G3)

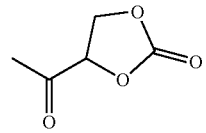
(D3)

(G4, D4) of respective formulae:

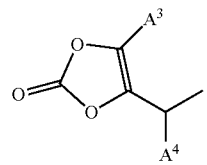
(G4)

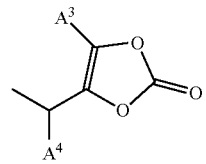
(D4)

in which:
   $A^3$ and $A^4$, which may be identical or different, each represent a hydrogen atom, a linear or branched alkyl radical of 1 to 6 carbon atoms, a cycloalkyl radical of 5 or 6 carbon atoms, a phenyl radical or an alkylphenyl group, the alkyl chain of which has 1 to 4 carbon atoms;
   $A^3$ and $A^4$ also possibly being bonded together to form a group —$(CH_2\text{-})_q$- in which q is an integer ranging from 3 to 5;

wherein the main chain of said copolymer P comprises:
   a unit (I) of formula (I) repeated p times, p being an integer other than 0:

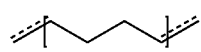
(I)

a unit (II) of formula (II) repeated n times, n being an integer other than 0:

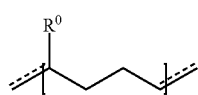

(II)

in which R represents the methyl radical or one of the three radicals having the following formula:

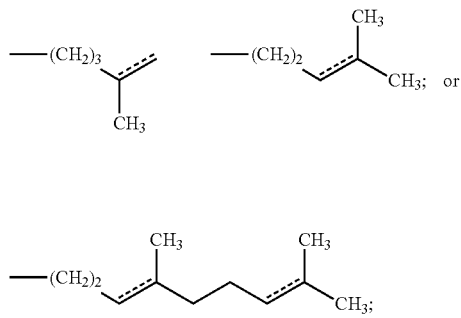

and, optionally, a unit (III) of formula (III) repeated m times, m being an integer greater than or equal to 0:

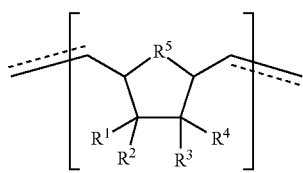

(III)

in which:
$R^1$, $R^2$, $R^3$ and $R^4$, which may be identical or different, represent:
  a hydrogen or halogen atom; or
  a radical comprising from 1 to 22 carbon atoms which is alkyl, alkenyl, alkoxycarbonyl, alkenyloxycarbonyl, alkylcarbonyloxy, alkenylcarbonyloxy or alkylcarbonyloxyalkyl, the hydrocarbon-based chain of said radical possibly being optionally interrupted with at least one oxygen atom or one sulfur atom; in addition:
  at least one of the groups $R^1$ to $R^4$ can form, with at least one other of the groups $R^1$ to $R^4$ and with the carbon atom or atoms to which said groups are linked, a 3- to 10-membered, optionally substituted, saturated or unsaturated hydrocarbon-based ring or heterocycle; and
  at least one of the pairs ($R^1$, $R^2$) and ($R^3$, $R^4$) can form, with the carbon atom to which said pair is linked, a group of two carbon atoms linked by a double bond: C=C, the other carbon atom of which bears two substituents that are a hydrogen atom and a $C_1$-$_C$4 alkyl radical; and
  the carbon atom bearing one of the groups of the pair ($R^1$, $R^2$) may be linked to the carbon atom bearing one of the groups of the pair ($R^3$, $R^4$) by a double bond, it being understood that, in accordance with the valency rules, only one of the groups of each of these two pairs is then present;

$R^5$ represents:
  an oxygen or sulfur atom, or
  a divalent radical —$CH_2$—, —C(=O)— or —$NR^6$— in which $R^6$ is an alkyl or alkenyl radical comprising from 1 to 22 carbon atoms;
the bond ===== represents a single bond or a double bond;
$F^1$ and $F^2$ are each linked to one of the two ends of the main chain and to a unit (I);
and (i) $F^1$ and $F^2$ have the respective formulae:

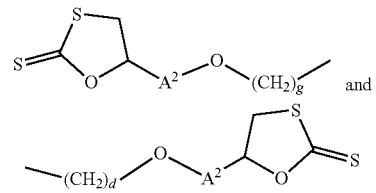

in which:
$A^2$ is a methylene group; and
g and d are equal to 1;
(ii) $F^1$ and $F^2$ have the respective formulae:

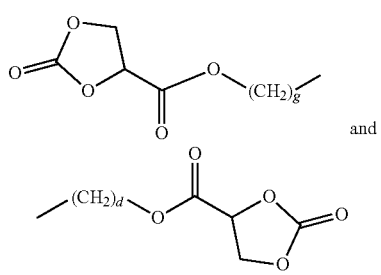

in which g and d are equal to 1; or
(iii) $F^1$ and $F^2$ have the respective formulae:

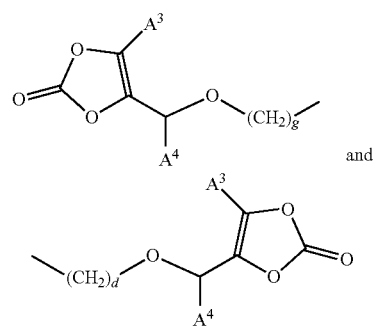

in which:
$A^3$ is a methyl, $A^4$ is a hydrogen atom; and
g and d are equal to 1;
n, p and m are such that the number-average molecular mass Mn of the copolymer P is within a range extending from 400 to 100 000 g/mol and its polydispersity index is within a range extending from 1.5 to 3.0.

* * * * *